(12) United States Patent
Suda et al.

(10) Patent No.: US 8,741,179 B2
(45) Date of Patent: Jun. 3, 2014

(54) PROCESS AND EQUIPMENT FOR REFORMING GASIFICATION GAS

(75) Inventors: Toshiyuki Suda, Tokyo (JP); Toshiro Fujimori, Tokyo (JP); Hiroaki Ohara, Tokyo (JP)

(73) Assignee: IHI Corporation, Tokyo (JP)

( * ) Notice: Subject to any disclaimer, the term of this patent is extended or adjusted under 35 U.S.C. 154(b) by 855 days.

(21) Appl. No.: 12/995,328

(22) PCT Filed: Jun. 12, 2009

(86) PCT No.: PCT/JP2009/002661
§ 371 (c)(1),
(2), (4) Date: Nov. 30, 2010

(87) PCT Pub. No.: WO2009/153948
PCT Pub. Date: Dec. 23, 2009

(65) Prior Publication Data
US 2011/0076227 A1   Mar. 31, 2011

(30) Foreign Application Priority Data

Jun. 17, 2008   (JP) .................................. 2008-157382

(51) Int. Cl.
*B01J 7/00* (2006.01)
*C10J 1/00* (2006.01)
*C10K 3/00* (2006.01)
*C01B 3/36* (2006.01)

(52) U.S. Cl.
USPC .................. 252/373; 48/61; 48/197 R; 48/210

(58) Field of Classification Search
CPC .................. C10J 2300/1869; C10J 2300/1846; C10J 3/00; C10K 1/002
USPC .................. 422/129, 139, 141, 168, 170, 176; 48/197 R, 210, 61; 423/650; 252/373
See application file for complete search history.

(56) References Cited

U.S. PATENT DOCUMENTS

| 7,722,690 B2* | 5/2010 | Shires et al. ................. 48/197 R |
| 2007/0175095 A1* | 8/2007 | Ito et al. .................... 48/197 FM |

FOREIGN PATENT DOCUMENTS

| JP | 10-236801 | 9/1998 |
| JP | 11-21564 | 1/1999 |

(Continued)

OTHER PUBLICATIONS

International Search Report issued Jul. 7, 2009, in PCT/JP2009/002661.

(Continued)

*Primary Examiner* — Stanley Silverman
*Assistant Examiner* — Syed Iqbal
(74) *Attorney, Agent, or Firm* — Oblon, Spivak, McClelland, Maier & Neustadt, L.L.P.

(57) ABSTRACT

Reforming of a gasification gas is performed by supplying both a tar-containing gasification gas and oxygen to a reforming furnace and burning a part of the gasification gas to heat an inside of the reforming furnace to a target reforming temperature required for reforming. Oxygen 9 and a first stage gasification gas 3a are supplied to a reforming furnace at an end of the furnace in amounts so as to attain the target reforming temperature required for reforming by combustion of the gasification gas with the oxygen to form a heating zone A in the reforming furnace 1. The remaining gasification gas is supplied as second stage gasification gas 3b to a vicinity downstream of the heating zone A in the reforming furnace 1 to form a reforming zone B.

18 Claims, 4 Drawing Sheets

(56) References Cited

FOREIGN PATENT DOCUMENTS

| | | |
|---|---|---|
| JP | 2003-262319 | 9/2003 |
| JP | 2009-108188 | 5/2009 |

OTHER PUBLICATIONS

"Mokushitsu Biomass no Gas-ka Hatsuden Wagakoku Hatsu no Jissho Plant Kansei", Gekkan Energy, 37(10), 2004, pp. 67 to 69.

* cited by examiner

PROCESS AND EQUIPMENT FOR REFORMING GASIFICATION GAS

TECHNICAL FIELD

The present invention relates to a process and an equipment for reforming gasification gas adapted to enhance production of hydrogen in the simple equipment.

BACKGROUND ART

Nowadays, a raw material such as coal or biomass has been gasified by a gasification device such as a fluidized- or fixed-bed gasification furnace to produce highly combustible gasification gas. The gasification gas produced is used, for example, as fuel for combustion as it is, is refined to obtain a target gas component or is liquefied into liquid fuel. The gasification gas has gas components such as hydrogen ($H_2$), hydrocarbon ($C_mH_n$), carbon monoxide (CO) and carbon dioxide ($CO_2$) as well as steam ($H_2O$) and tar.

The gasification gas produced by the gasification device is transferred to and used in succeeding various devices such as the above-mentioned refining and other devices. In this case, tar contained in the gasification gas may attach to and accumulate in a piping and devices to thereby cause clogging or other troubles. To overcome this, a scrubber is conventionally arranged to remove the tar through water jet.

Meanwhile, there has been conducted tar reforming through temperature elevation by supplying the gasification gas and oxygen ($O_2$) to a reforming furnace to burn a part of the gasification gas. This reforming prevents the tar from attaching to and accumulating in the piping and devices since unreformed tar is turned into solid carbon (char), and causes the gas reformed to have enriched $H_2$, CO and CH.

In the reforming furnace, tar is reformed according to the following reactions.

[EQ 1]

$$tar \xrightarrow{pyrolysis} CO + H_2 + C_mH_n + soot \quad (1)$$

$$tar + H_2O \longrightarrow CO + H_2 + C_mH_n \quad (2)$$

$$tar + CO_2 \longrightarrow CO + H_2 + C_mH_n \quad (3)$$

In the reforming furnace, hydrocarbon is reformed according to the following reaction.

[EQ 2]

$$C_mH_n + H_2O \rightarrow CO + H_2 \quad (4)$$

Products produced by the reforming reaction are supplied with oxygen ($O_2$) to react as follows.

[EQ 3]

$$C_mH_n + O_2 \rightarrow CO_2 + H_2O \quad (5)$$

$$2H_2 + O_2 \rightarrow 2H_2O \quad (6)$$

$$2CO + O_2 \rightarrow 2CO_2 \quad (7)$$

$$tar + O_2 \rightarrow CO_2 + H_2O \quad (8)$$

Prior art technologies on a reforming furnace are disclosed, for example, in Patent Literatures 1 and 2.

CITATION LIST

Patent Literatures

Patent Literature 1: JP 2003-262319A
Patent Literature 2: JP 3415748B

SUMMARY OF INVENTION

Technical Problems

In the conventional reforming furnace as shown in the Patent Literature 1 or 2, gasification gas and oxygen are supplied to a reforming furnace at one end thereof to burn a part of gasification gas with oxygen to thereby enhance an inside of the reforming furnace into a target reforming temperature suitable for progress of reforming. Such target reforming temperature is maintained for a time required (or reaction time is maintained) for reforming the gasification gas.

However, as mentioned in the above, when the gasification gas and oxygen are supplied to a reforming furnace at one end thereof, the oxygen supplied acts to mainly and selectively react with $H_2$ to enhance the inside of the reforming furnace up to a required target reforming temperature, so that $H_2$ highly servable for many uses as gasification gas product is wastefully consumed for temperature elevation, with a disadvantageous result that a concentration of $H_2$ is lowered in the reformed gas discharged from the reforming furnace. Thus, it turns out that, in the reforming furnace, production reaction of $H_2$ is conducted after the concentration of $H_2$ is once decreased by the combustion, so that the reaction must be maintained for a long time so as to obtain a target concentration of $H_2$, disadvantageously resulting in that the reforming furnace must be large-sized in length.

The invention was made in view of the above and has its object to provide a process and an equipment for reforming gasification gas adapted to enhance production of hydrogen in the equipment which is compact in size and simple in structure.

Solution to Problems

The invention is directed to a process for reforming gasification gas wherein tar-containing gasification gas and oxygen are supplied to a reforming furnace, a part of the gasification gas being burned to enhance an inside of the reforming furnace to a target reforming temperature required for reforming, thereby conducting reforming of the gasification gas, characterized in that oxygen and first stage gasification gas are supplied to the reforming furnace at one end thereof in amounts so as to obtain the target reforming temperature required for reforming through combustion of the gasification gas with the oxygen to thereby form a heating zone in the reforming furnace and that the remaining gasification gas is supplied as second stage gasification gas to a vicinity downstream of the heating zone in the reforming furnace to thereby form a reforming zone.

In the process for reforming the gasification gas, it is preferable that the target reforming temperature in the reforming zone is in a range of 900-1400° C.

In the process for forming the gasification gas, it is preferable that the heating temperature in the heating zone is set to a higher temperature in expectation of temperature lowering in the reforming zone owing to supply of the second stage gasification gas.

The invention is also directed to an equipment for reforming gasification gas wherein tar-containing gasification gas and oxygen are supplied to a reforming furnace, a part of the gasification gas being burned to enhance an inside of the reforming furnace to a target reforming temperature required for reforming, thereby conducting reforming of the gasification gas, characterized in that the equipment comprises an oxygen supply passage and a first stage gasification gas supply passage for supply of the oxygen and the part of the gasification gas to the reforming furnace at an end thereof in amounts so as to attain the target reforming temperature required for reforming by combustion of the gasification gas to thereby form a heating zone in the reforming furnace, and a second stage gasification gas supply passage for supplying the remaining gasification gas to a vicinity downstream of said heating zone to thereby form a reforming zone.

In the equipment for reforming the gasification gas, it is preferable that the oxygen supply passage is provided with flow rate regulating means for regulating an amount of the oxygen supplied through said oxygen supply passage to the reforming furnace.

In the equipment for reforming the gasification gas, it is preferable that first stage gasification gas supply passage is provided with flow rate regulating means for regulating an amount of the gasification gas supplied through said first stage gasification gas supply passage to the reforming furnace.

In the equipment for reforming the gasification gas, it is preferable that the first stage gasification gas supply passage is provided with a first stage nozzle for tangentially supplying the gasification gas to an outer periphery of the reforming furnace.

In the equipment for reforming the gasification gas, it is preferable that a plurality of first stage nozzles are circumferentially equidistantly arranged around the reforming furnace.

In the equipment for reforming the gasification gas, it is preferable that the second stage gasification gas supply passage is provided with a second stage nozzle for tangentially supplying the gasification gas to an outer periphery of the reforming furnace.

In the equipment for reforming the gasification gas, it is preferable that a plurality of second stage nozzles are circumferentially equidistantly arranged around the reforming furnace.

Advantageous Effects of Invention

According to a process and an equipment for reforming gasification gas of the invention, oxygen and first stage gasification gas are supplied to a reforming furnace at one end thereof in amounts so as to attain a target reforming temperature required for reforming by combustion of the gasification gas with the oxygen to form a heating zone in the reforming furnace, the remaining gasification gas being supplied as second stage gasification gas to a vicinity downstream of the heating zone in the reforming furnace to form a reforming zone, thereby conducting reforming of the gasification gas, so that tar contained in the first stage gasification gas is also burned in the heating zone to keep a target reforming temperature. The second stage gasification gas supplied to a vicinity downstream of the heating zone is supplied, with the oxygen being burned out, to the reforming zone where the target reforming temperature is kept, so that only the reforming reaction is facilitated without combustion of the hydrogen; thus, advantageously, the reformed gas can be taken out with enhanced concentration of hydrogen.

Furthermore, in the reforming zone, the reforming reaction can be effectively facilitated without combustion of hydrogen to enhance the concentration of hydrogen, so that the reaction time can be shortened in comparison with the prior art, with an advantageous result that the reforming furnace can be made compact in size.

DESCRIPTION OF EMBODIMENTS

Embodiments of the invention will be described in conjunction with attached drawings.

Figure 1:
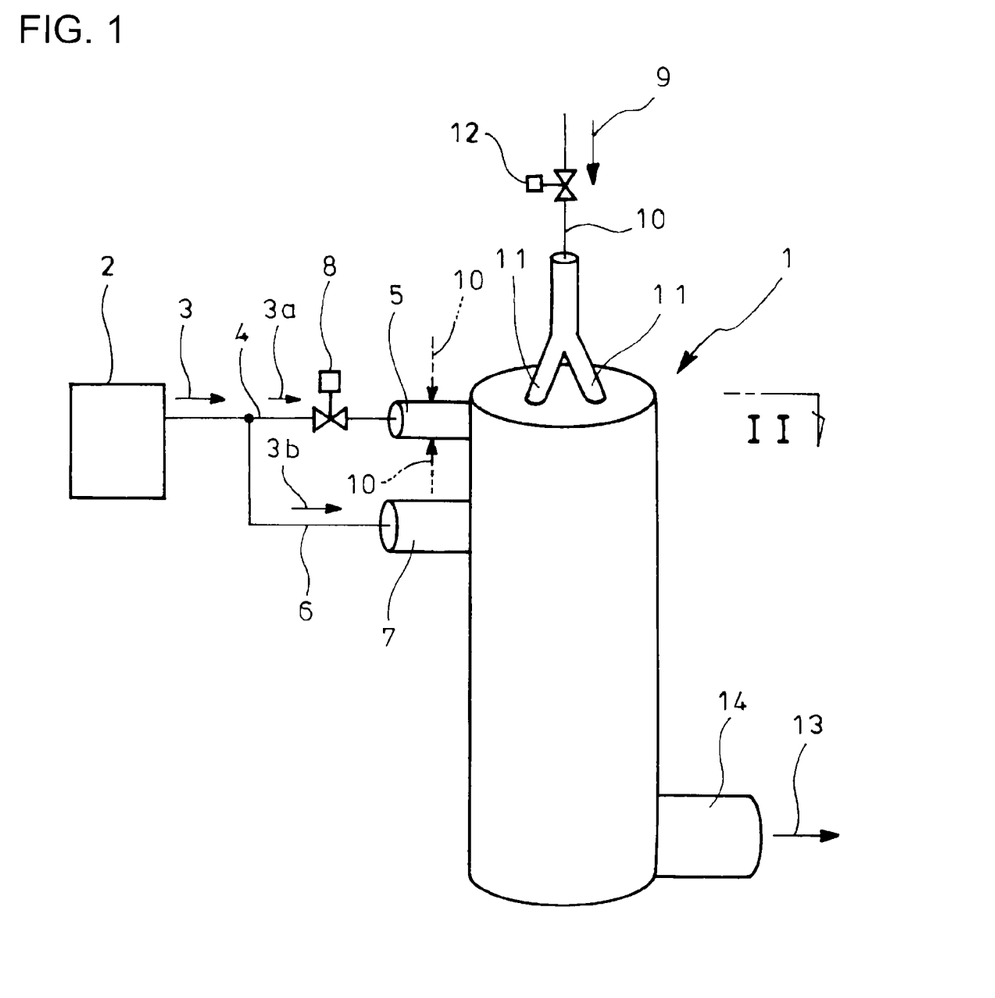
FIG. 1 is a perspective front view showing an embodiment of a reforming equipment according to the invention.
Figure 2:
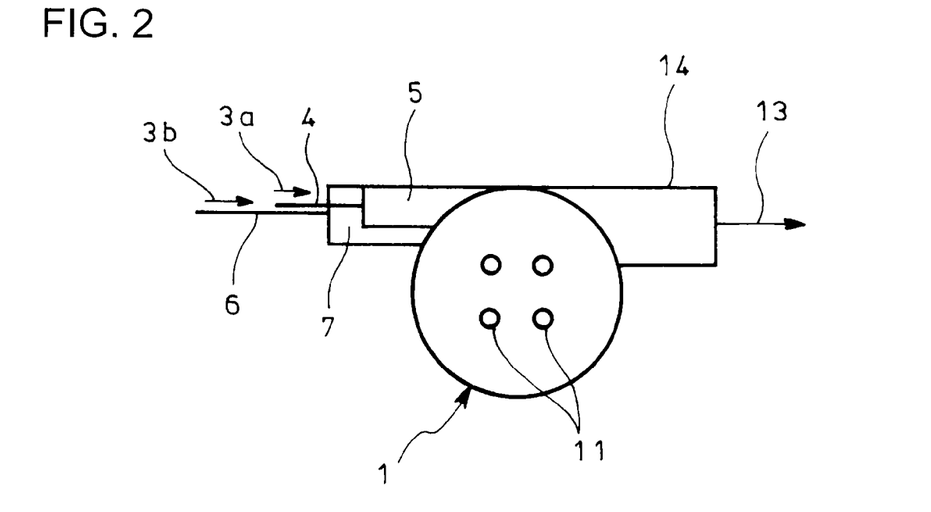
FIG. 2 is a plan view of the reforming equipment looking in a direction of arrow II in FIG. 1.

FIG. 1 is a perspective front view of an embodiment of a reforming equipment according to the invention, and FIG. 2 is a plan view looking the reforming equipment of FIG. 1 in the direction of arrow II.

In FIGS. 1 and 2, reference numeral 1 denotes a cylindrical reforming furnace which is provided at its one end (an upper end in FIG. 1) with a first stage gasification gas supply passage 4 for supply of a part of gasification gas 3 produced in a gasification device 2 as first stage gasification gas 3a. The supply passage 4 has a first stage nozzle 5 for supply of the first stage gasification gas 3a tangentially against an outer periphery of the reforming furnace 1 adjacent to the one end, thereby forming a swirling flow in the reforming furnace 1. An intermediate portion of the reforming furnace 1 away from the one end is provided with a second stage gasification gas supply passage 6 for branchingly supplying the remainder of the gasification gas 3 from the gasification device 2 as second stage gasification gas 3b. The supply passage 6 has a second stage nozzle 7 for supplying the second stage gasification gas 3b tangentially against the outer periphery of the reforming furnace 1, thereby forming a swirling flow in the reforming furnace 1 in a direction same as that of the first stage nozzle 5.

The first stage gasification gas supply passage 4 is provided with a valve or other flow rate regulating means 8 for regulating an amount of the first stage gasification gas 3a supplied through the supply passage 4 to the reforming furnace 1.

A surface on the end of the reforming furnace 1 is provided with an oxygen supply passage 10 for supply of oxygen ($O_2$) 9 connected to the reforming furnace 1 through a plurality of (four in FIG. 2) oxygen nozzles 11 which enhance mixing of the oxygen 9 to the first stage gasification gas 3a supplied by the first stage nozzle 5. The oxygen supply passage 10 is provided with flow rate regulating means 12 for regulating an amount of the oxygen 9 supplied through the oxygen supply passage 10 to the reforming furnace 1. Alternatively, as shown in FIG. 1 by dotted lines, the oxygen supply passage 10 may be connected to the first stage nozzle 5 to directly add the oxygen 9 to the first stage gasification gas 3a supplied through the nozzle 5.

Figure 3:
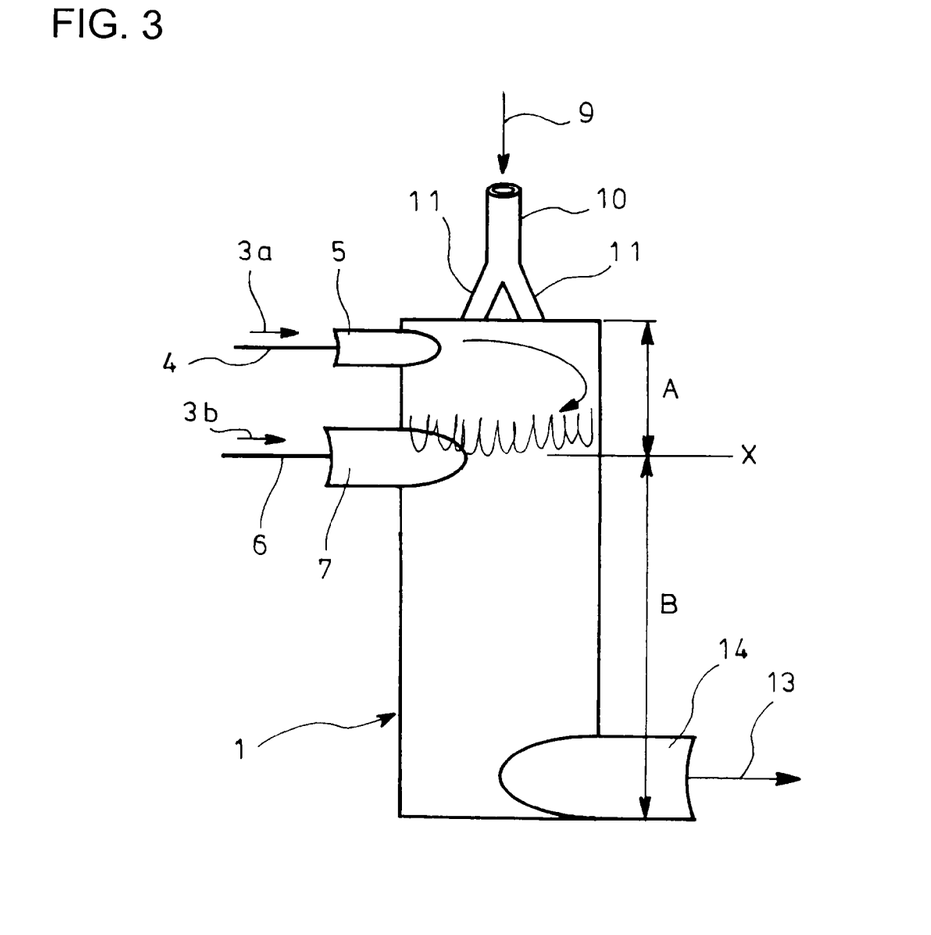
FIG. 3 is a sectional view showing the operation of the reforming equipment of FIG. 1.

In the above, the flow rate regulating means 12 is used to supply the oxygen 9 through the oxygen supply passage 10 in an amount so as to attain, through combustion with the gasification gas 3, a target reforming temperature (900-1400° C.) required for reforming in the reforming furnace 1. The flow rate regulating means 8 is used to supply the first stage gasification gas 3a through the first stage gasification gas supply passage 4 in an amount so as to attain the target reforming temperature through the combustion with the oxygen 9. Thus, as shown in FIG. 3, the one end of the reforming furnace 1 is internally formed with a heating zone A. Meanwhile, the second stage gasification gas supply passage 6 is connected to the reforming furnace 1 at a position just below a completion point X downstream of the heating zone A, so that formed between the completion point X of the heating zone A and the other end (a lower end) of the reforming furnace 1 is a reforming zone B where a target reforming temperature of 900-1400° C. is kept. Though the connection position of the second stage gasification gas supply passage 6 to the reforming furnace 1 may be anywhere in a vicinity downstream of the heating zone A, the connection just below the completion point X of the heating zone A is preferable since the reforming furnace 1 can be made compact in size.

The target reforming temperature is a temperature at which reforming is actually performed in the reforming zone B; and the heating temperature of the heating zone A is set to a temperature higher than the target reforming temperature. Specifically, if both the target reforming temperature and the heating temperature of the heating zone A were set to, for example, 1200° C., then the temperature of the reforming zone B might become, for example, 1100° C., failing to obtain a temperature sufficient for reforming, since the temperature of the reforming zone B is lowered by the supply thereto of the second stage gasification gas 3b with the temperature of, for example, 900° C. or less and is also lowered by an endothermic reaction of reforming the tar in the second stage gasification gas 3b. In order to overcome this, on the basis of thermal calculation or empirical rule, the temperature of the heating zone A is set to a higher temperature in expectation of temperature lowering in the reforming zone B. Specifically, the amount of the first stage gasification gas 3a supplied and the amount of the oxygen 9 supplied are regulated by the flow rate regulating means 8 and 12, respectively, so as to keep the temperature of the heating zone A to, for example, 1400° C., thereby keeping the target reforming temperature of the reforming zone B to 1200° C.

The other end of the reforming furnace 1 is provided with a withdrawal passage 14 through which the reformed gas 13 is withdrawn. The withdrawal passage 14 is tangentially connected to the outer periphery of the reforming furnace 1 so as to keep the swirling flow.

An operation of the embodiment shown in FIGS. 1-3 will be described.

A part of the gasification gas 3 produced by the gasification device 2 is supplied as the first stage gasification gas 3a through the first stage gasification gas supply passage 4 tangentially into the one end of the reforming furnace 1 via the first stage nozzle 5, and the remaining gasification gas 3 is supplied as the second stage gasification gas 3b through the second stage gasification gas supply passage 6 tangentially into the intermediate portion of the reforming furnace 1 away from the one end via the second stage nozzle 7.

Meanwhile, the oxygen 9 through the oxygen supply passage 10 is supplied into the reforming furnace 1 via the oxygen nozzles 11 on the surface of the one end of the reforming furnace 1.

In this regard, the flow rate regulating means 12 is used to supply the oxygen 9 through the oxygen supply passage 10 in an amount so as to attain, through combustion with the first stage gasification gas 3a, a target reforming temperature of, for example, 900-1400° C. required for reforming in the reforming furnace 1. The flow rate regulating means 8 is used to supply the first stage gasification gas 3a through the first stage gasification gas supply passage 4 in an amount so as to attain the target reforming temperature through the combustion with the oxygen 9. Thus, as shown in FIG. 3, the one end of the reforming furnace 1 is internally formed with the heating zone A. The heating temperature of the heating zone A is set to a higher temperature in expectation of temperature lowering of the reforming zone B owing to supply of the second stage gasification gas.

In the heating zone A, $H_2$ in the first stage gasification gas 3a is firstly and selectively burned to attain temperature elevation, and then CO and CH in the first stage gasification gas 3a is burned to further elevate the temperature so that tar in the first stage gasification gas 3a is also burned. At the completion point X downstream of the above-mentioned heating zone A, the oxygen 9 from the oxygen supply passage 10 has been burned out.

The second stage gasification gas 3b through the second stage gasification gas supply passage 6 is supplied just downstream of the completion point X of the heating zone A, so that, in the reforming zone B where the oxygen has been burned out, $H_2$ in the second stage gasification gas 3b is not burned and only the reforming reaction is facilitated. Thus, the reformed gas 13 with enriched $H_2$, CO and CH is withdrawn through the withdrawal passage 14.

As mentioned in the above, the first stage gasification gas 3a and the oxygen 9 are supplied in set amounts to the one end of the reforming furnace 1 for combustion to form the heating zone A with the reforming zone B formed downstream with the target reforming temperature being kept for progress of reforming, the second stage gasification gas 3b being supplied for reforming to the reforming zone B formed just below the completion point X downstream of the heating zone A. As a result, tar in the first stage gasification gas 3 is also burned in the heating zone A heated to the target reforming temperature; in the reforming zone B just below the completion point X downstream of the heating zone A and where the second stage gasification gas 3b is supplied and the target reforming temperature is kept with the oxygen 9 having been burned out, only the reforming reaction is facilitated without the combustion of $H_2$, thereby obtaining the reformed gas 13 with increased concentration of $H_2$.

Furthermore, in the reforming zone B, without the combustion of $H_2$, the reforming reaction is effectively facilitated to enhance hydrogen concentration, so that the reaction time can be reduced in comparison with the prior art and the reforming furnace 1 can be made compact in size.

Figure 4:
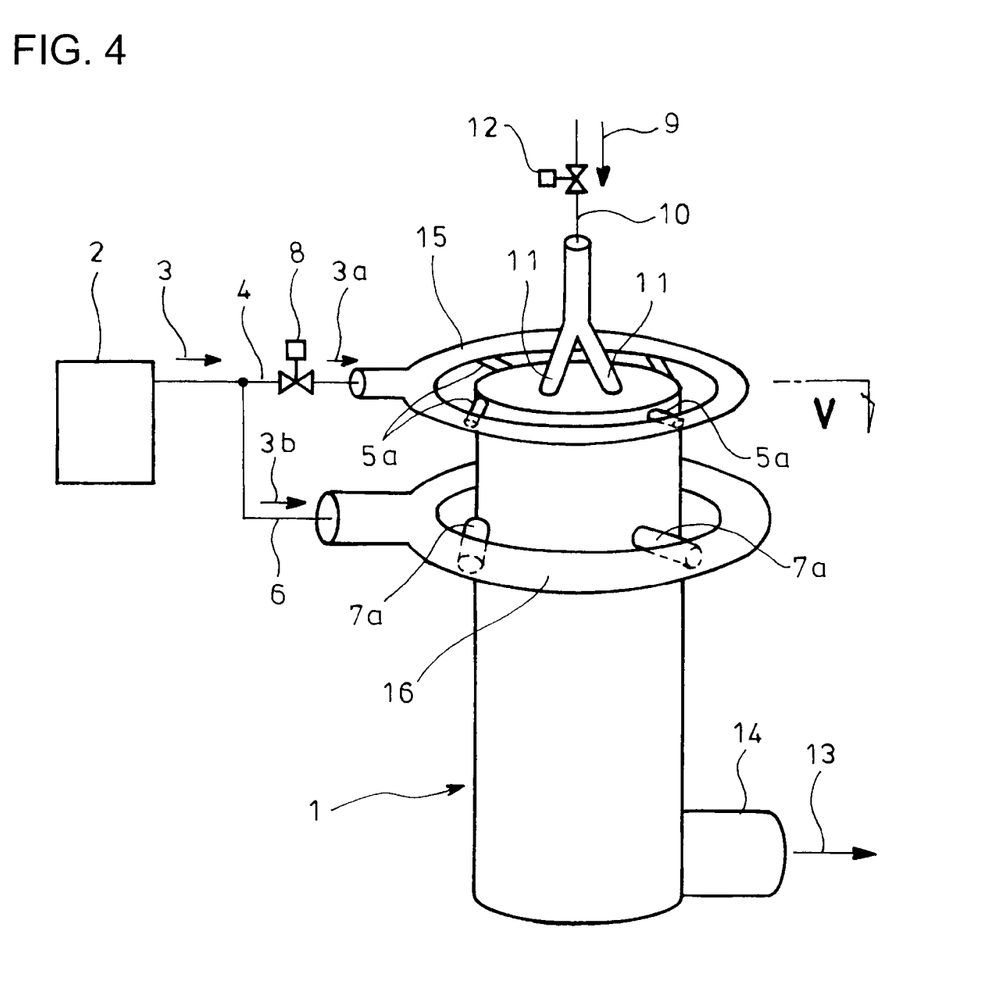
FIG. 4 is a perspective front view showing a further embodiment of a reforming equipment according to the invention.
Figure 5:
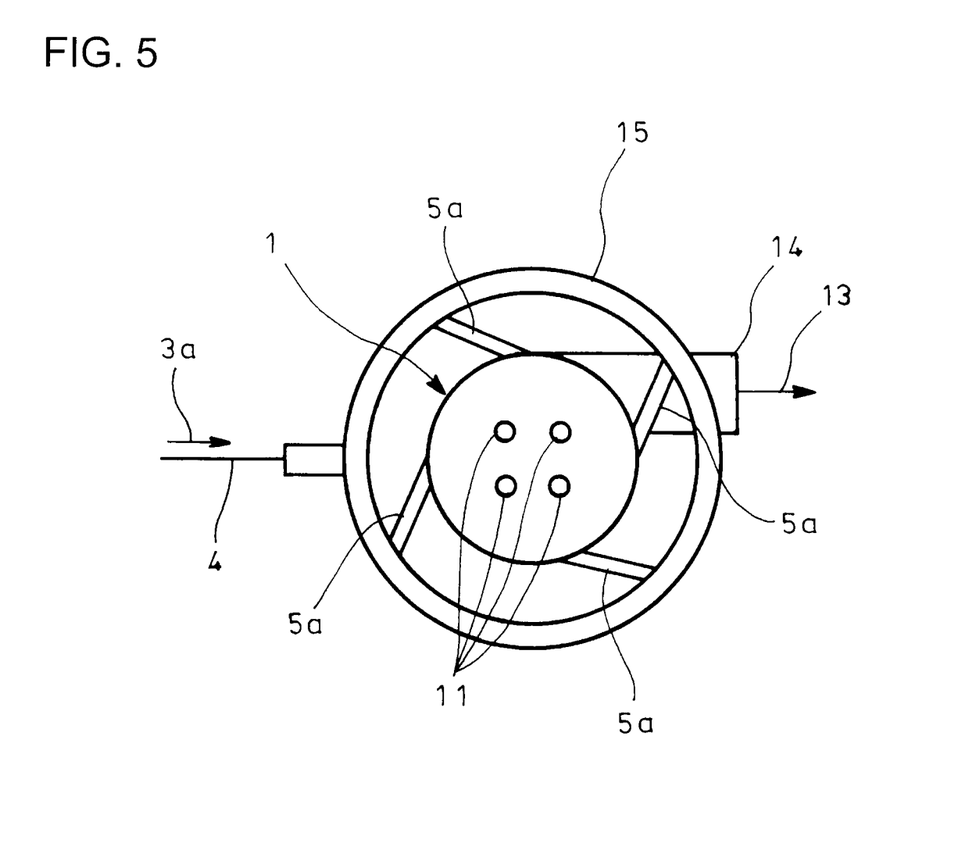
FIG. 5 is a plan view of the reforming equipment looking in a direction of arrow V in FIG. 4.

FIGS. 4 and 5 show a further embodiment of the invention. In FIGS. 4 and 5, the first stage gasification gas supply passage 4 has an annular supply pipe 15 surrounding the reforming furnace 1. The annular supply pipe 15 is provided with a plurality of first stage nozzles 5a circumferentially equidistantly arranged on the pipe 15 for supplying the first stage gasification gas 3a tangentially into the reforming furnace 1.

The second stage supply gasification gas passage 6 also has an annular supply pipe 16 surrounding the reforming furnace 1. The annular supply pipe 16 is provided with a plurality of second stage nozzles 7a circumferentially equidistantly arranged on the pipe 16 for supplying the second stage gasification gas 3b tangentially into the reforming furnace 1.

As shown in FIGS. 4 and 5, with the circumferentially equidistant first stage nozzles 5a and the circumferentially equidistant second stage nozzles 7a tangentially against the reforming furnace 1, the first stage gasification gas 3a and the second stage gasification gas 3b are dispersively supplied into the reforming furnace 1, so that uniform heating and uniform reforming reaction can be performed in the heating zone A and the reforming zone B, respectively.

It is to be understood that the invention is not limited to the above embodiments and that various changes and modifications may be made without departing from the scope of the invention.

INDUSTRIAL APPLICABILITY

A process and an equipment for reforming gasification gas according to the invention may be applied when the reforming reaction is to be effectively facilitated to make a reforming furnace compact in size.

REFERENCE SIGNS LIST 1 reforming furnace
3 gasification gas
3a first stage gasification gas
3b second stage gasification gas
4 first stage gasification gas supply passage
5 first stage nozzle
5a first stage nozzle
6 second stage gasification gas supply passage
7 second stage nozzle
7a second stage nozzle
8 flow rate regulating means
9 oxygen
10 oxygen supply passage
12 flow rate regulating means
A heating zone
B reforming zone
X completion point

The invention claimed is:

1. A process for reforming gasification gas, comprising supplying a first-stage tar gasification gas and oxygen to a reforming furnace, burning a part of the gasification gas to enhance an inside of the reforming furnace to a target reforming temperature required for reforming, thereby conducting reforming of the gasification gas, wherein oxygen and the first stage tar gasification gas are supplied to the reforming furnace at one end thereof in amounts so as to obtain the target reforming temperature required for reforming through combustion of the gasification gas with the oxygen to thereby form a heating zone in the reforming furnace and that the remaining gasification gas is supplied as second stage gasification gas to a vicinity downstream of the heating zone in the reforming furnace to thereby form a reforming zone.

2. The process for reforming gasification gas as claimed in claim 1, wherein the target reforming temperature in the reforming zone is in a range of 900-1400° C.

3. The process for reforming gasification gas as claimed in claim 1, wherein the heating temperature in the heating zone is set to a higher temperature in expectation of temperature lowering in the reforming zone owing to supply of the second stage gasification gas.

4. An equipment for reforming gasification gas wherein a tar gasification gas and oxygen are supplied to a reforming furnace, a part of the gasification gas being burned to enhance an inside of the reforming furnace to a target reforming temperature required for reforming, thereby conducting reforming of the gasification gas, wherein the equipment comprises an oxygen supply passage and a first stage gasification gas supply passage for supply of the oxygen and the part of the gasification gas to the reforming furnace at an end thereof in amounts so as to attain the target reforming temperature required for reforming by combustion of the gasification gas to thereby form a heating zone in the reforming furnace, and a second stage gasification gas supply passage for supplying the remaining gasification gas to a vicinity downstream of said heating zone to thereby form a reforming zone.

5. The equipment for reforming gasification gas as claimed in claim 4, wherein the oxygen supply passage is provided with flow rate regulating means for regulating an amount of the oxygen supplied through said oxygen supply passage to the reforming furnace.

6. The equipment for reforming gasification gas as claimed in claim 4, wherein the first stage gasification gas supply passage is provided with flow rate regulating means for regulating an amount of the gasification gas supplied through said first stage gasification gas supply passage to the reforming furnace.

7. The equipment for reforming gasification gas as claimed in claim 5, wherein the first stage gasification gas supply passage is provided with flow rate regulating means for regulating an amount of the gasification gas supplied through said first stage gasification gas supply passage to the reforming furnace.

8. The equipment for reforming gasification gas as claimed in claim 6, wherein the first stage gasification gas supply passage is provided with a first stage nozzle for supplying the gasification gas tangentially into an outer periphery of the reforming furnace.

9. The equipment for reforming gasification gas as claimed in claim 7, wherein the first stage gasification gas supply passage is provided with a first stage nozzle for supplying the gasification gas tangentially into an outer periphery of the reforming furnace.

10. The equipment for reforming gasification gas as claimed in claim 8, wherein a plurality of first stage nozzles are circumferentially equidistantly arranged around the reforming furnace.

11. The equipment for reforming gasification gas as claimed in claim 4, wherein the second stage gasification gas supply passage is provided with a second stage nozzle for supplying the gasification gas tangentially into an outer periphery of the reforming furnace.

12. The equipment for reforming gasification gas as claimed in claim 8, wherein the second stage gasification gas supply passage is provided with a second stage nozzle for supplying the gasification gas tangentially into an outer periphery of the reforming furnace.

13. The equipment for reforming gasification gas as claimed in claim 9, wherein the second stage gasification gas supply passage is provided with a second stage nozzle for supplying the gasification gas tangentially into an outer periphery of the reforming furnace.

14. The equipment for reforming gasification gas as claimed in claim 11, wherein a plurality of second stage nozzles are circumferentially equidistantly arranged around the reforming furnace.

15. The process for reforming gasification gas as claimed in claim 2, wherein the heating temperature in the heating zone is set to a higher temperature in expectation of temperature lowering in the reforming zone owing to supply of the second stage gasification gas.

16. The equipment for reforming gasification gas as claimed in claim 9, wherein a plurality of first stage nozzles are circumferentially equidistantly arranged around the reforming furnace.

17. The equipment for reforming gasification gas as claimed in claim 12, wherein a plurality of second stage nozzles are circumferentially equidistantly arranged around the reforming furnace.

18. The equipment for reforming gasification gas as claimed in claim 13, wherein a plurality of second stage nozzles are circumferentially equidistantly arranged around the reforming furnace.

* * * * *